(12) United States Patent
Stack

(10) Patent No.: US 10,487,880 B2
(45) Date of Patent: Nov. 26, 2019

(54) SPLIT DRIVE TRAIN

(71) Applicant: Brian Stack, Honolulu, HI (US)

(72) Inventor: Brian Stack, Honolulu, HI (US)

( * ) Notice: Subject to any disclaimer, the term of this patent is extended or adjusted under 35 U.S.C. 154(b) by 0 days.

(21) Appl. No.: 15/246,257

(22) Filed: Aug. 24, 2016

(65) Prior Publication Data
US 2018/0058505 A1 Mar. 1, 2018

(51) Int. Cl.
*F16D 1/02* (2006.01)
*F16D 13/58* (2006.01)
*F16D 1/08* (2006.01)
*F16D 1/10* (2006.01)

(52) U.S. Cl.
CPC ............ *F16D 1/0864* (2013.01); *F16D 1/10* (2013.01); *F16D 2001/103* (2013.01)

(58) Field of Classification Search
CPC ..... F16D 1/00; F16D 1/02; F16D 1/04; F16D 13/58; F16D 1/033; Y10T 403/551; Y10T 403/55; Y10T 403/553; Y10T 403/556
See application file for complete search history.

(56) References Cited

U.S. PATENT DOCUMENTS

| | | | | |
|---|---|---|---|---|
| 2,334,449 A | * | 11/1943 | Strait | F16B 3/00 403/331 |
| 2,540,346 A | * | 2/1951 | Potter | F16B 7/22 403/340 |
| 2,617,673 A | * | 11/1952 | Sacks | F16D 1/033 403/383 |
| 3,524,665 A | * | 8/1970 | Hohn | F16D 1/033 403/273 |
| 4,699,017 A | * | 10/1987 | Periou | F16D 1/02 384/206 |
| 5,098,216 A | * | 3/1992 | Caperton | F16B 7/22 403/286 |
| 6,505,857 B2 | * | 1/2003 | Fosse | B62D 1/16 280/779 |
| 8,047,919 B2 | * | 11/2011 | Arden | F16D 1/02 403/2 |

FOREIGN PATENT DOCUMENTS

| | | | | |
|---|---|---|---|---|
| DE | 321387 | * | 12/1918 | ............ F16D 1/04 |
| EP | 1 703 156 | * | 9/2006 | ............ F16D 1/04 |

* cited by examiner

*Primary Examiner* — Michael P Ferguson

(57) ABSTRACT

A multi-section drive shaft transmission section with threading about an exterior surface, and a spline gear section extending into a clutch assembly with similar threading about a portion of an exterior surface. Between the transmission and the spline sections is a coupling section, with mating surfaces complimentary to respective mating surfaces located on the spline gear and transmission sections. The mating surfaces are designed to let the coupling either slide out of place, or to be removed by sliding the spline gear section further into the pilot bushing. The coupling, spline gear and transmission sections are secured in place with an anodized threaded sleeve. The transmission coupling, and spline gear sections make up a portion of a vehicle drive train. The coupling section can be slidably removed allowing the spline gear section to slide out of the pilot bushing and over a tab or tongue of the transmission section, which enables the clutch assembly to be removed from the drive train.

4 Claims, 8 Drawing Sheets

SPLIT DRIVE TRAIN

BACKGROUND

A clutch replacement usually involves the removal of an automobile transmission or engine, which is a major disassembly of the vehicle. Most of the cost and expense of a clutch replacement involves dropping the transmission or removing the engine when necessary. However, the actual replacement of the clutch assembly is fairly simple, and accounts for a small amount of time for the entire repair.

Conventionally, the sole purpose of the removal of the transmission is to remove the input shaft from the clutch assembly so the clutch can be repaired. Clutch replacements, like brake pad replacements, are considered items of wear, and therefore are the responsibility of the owner. Therefore, the ability to change the clutch without removing the transmission provides a major benefit to the vehicle owner. However, the design of conventional drive trains makes repairing the clutch difficult and expensive. Accordingly, improvements to an engine drive train may facilitate the repair of clutches.

SUMMARY

The disclosure herein provides for several improvements over conventional drive trains because they allow for easy removal and/or replacement of a vehicle clutch. In operation, a multipart drive shaft with a transmission section coupled to a vehicle transmission, may have threading about a portion of an exterior surface. Also included is a spline gear section, also with similar threading about a portion of its exterior surface. Between the transmission section and the spline gear section is a coupling, which has similar threading about an exterior surface. The coupling section includes a first mating surface removably associated with a complimentary mating surface on the spline gear and a second mating surface removably associated with a complementary surface on the transmission section. The coupling, spline gear, and transmission sections are secured in place with a threaded sleeve which may have a threaded interior surface configured to mate with the outer surface of the coupling, spline gear and transmission portions. Together the transmission, coupling, and spline gear sections make up a portion of a vehicle drive train.

Because the coupling section is slidably mounted between the transmission and spline gear the sections, it can be removed when the threaded sleeve is removed. In a tongue-in-grove configuration, once the coupling section is removed, the spline gear section's slightly larger groove can be slid back from the clutch assembly over the slightly smaller tongue of the transmission section, which, if the spline gear section is appropriately sized, will allow the spline gear section to drop out of a pilot bushing in the crankshaft. The clutch assembly will then have clearance to drop out of the drive train without necessitating removal of the transmission or engine.

The construction and method of operation of the invention, however, together with additional objectives and advantages thereof will be best understood from the following description of specific embodiments when read in connection with the accompanying drawings.

DESCRIPTION

Generality of Invention

Figure 1:
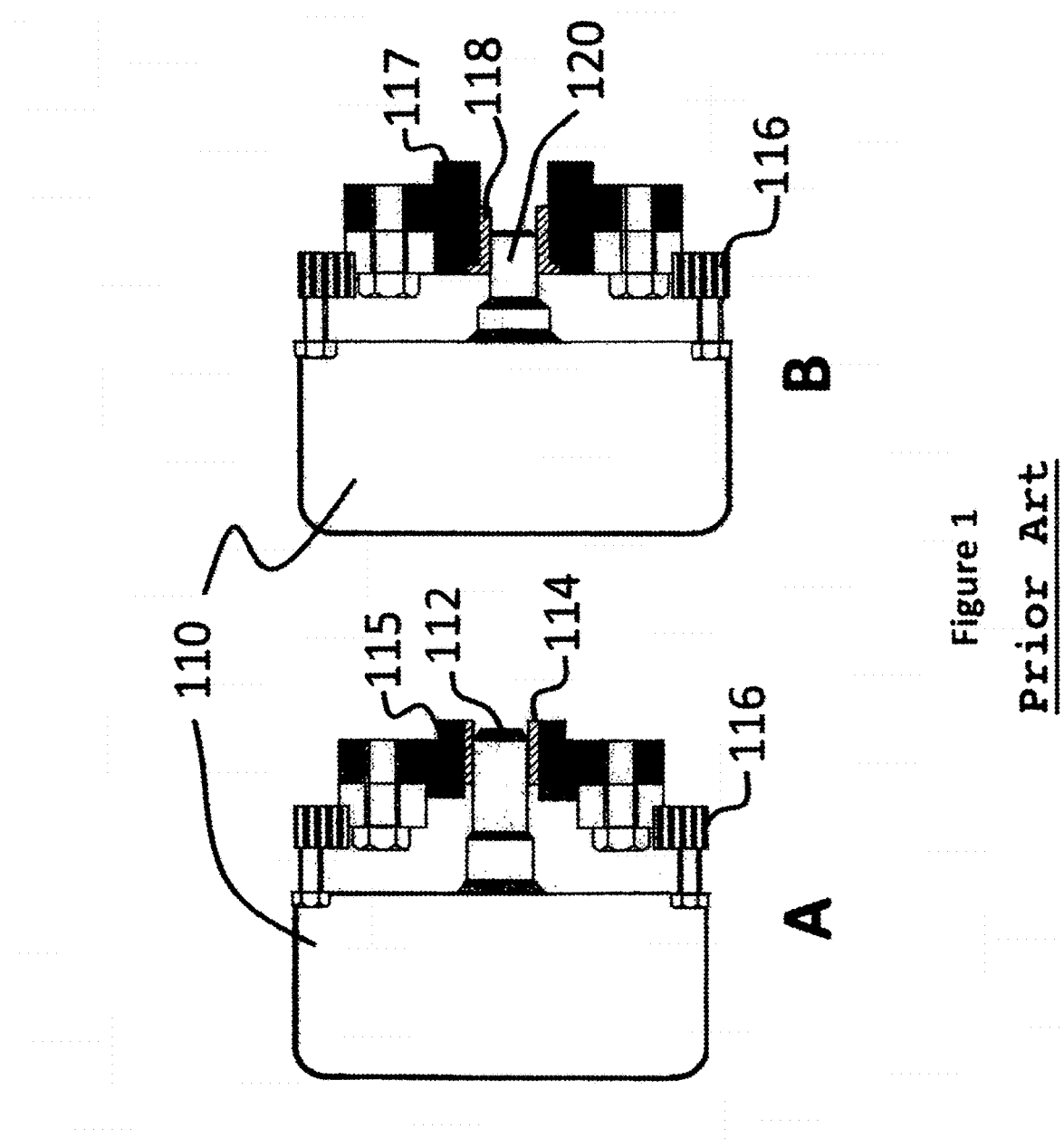
FIG. 1 illustrates a partially cutout side view of a common clutch assembly compared to an embodiment of the present disclosure.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

Lexicography

The term "drive train" generally refers to the parts of a vehicle that transfer power from an engine to the wheels.

The term "drive shaft" generally refers to a shaft that delivers torque or rotational force from one entity to another.

The term "input shaft" generally refers to a drive shaft that delivers torque from a power source to a transmission.

The term "crankshaft" generally refers to a shaft that turns the reciprocating motion of an engine's pistons and connecting rods that are connected to a series of offset crank throws or crankpins into rotational motion.

DETAILED DESCRIPTION

A conventional clutch assembly consists of many small parts, but usually has seven major components, a pressure plate bolted to a flywheel, a clutch disc mated to an input shaft, a throw-out bearing pressed onto a sleeve, and a clutch fork.

The flywheel is connected directly to the engine crankshaft and, therefore, spins with the engine's motions. Bolted to the flywheel is the second major component, a clutch pressure plate. Between the flywheel and the pressure plate is the clutch disc. The spring-loaded pressure plate has two jobs: to hold the clutch disc firmly to the flywheel and to release tension that allows the clutch disc to rotate freely. The clutch disc has friction surfaces similar to a brake pad on both sides that make or break contact with the metal flywheel and pressure plate surfaces, allowing for smooth engagement and disengagement.

The throw-out bearing and release system work together simultaneously to engage and disengage the process. The throw-out bearing is connected to one end of the clutch fork mechanism and rides on the front transmission cover. Depending on the type of release system, the throw-out bearing either pushes or releases the pressure plate diaphragm spring to engage or disengage the pressure plate's grip on the clutch disc when the clutch pedal is depressed or released.

Running through the center of the pressure plate, clutch disc and flywheel is the input shaft of a conventional transmission system. The shaft takes the input, or power of the engine, and sends it down through the gears to the wheels. At the point where the input shaft enters the transmission is a bearing that bears most of the shaft's spinning load. In the middle of the crankshaft/flywheel is a much smaller pilot bearing. The pilot bearing centers the input shaft in the center of the crankshaft/flywheel so it can rotate while the clutch assembly is engaged and disengaged. The input shaft is what the clutch disc itself is connected to.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

FIG. 1 illustrates a partially cutout side view of two clutch assemblies presented side-by-side for comparison. FIG. 1A shows a conventional clutch, whereas FIG. 1B shows a portion of an embodiment according to the current disclosure. Conventionally, vehicles would be designed with inspection pans allowing access to a clutch assembly through the bottom of the transmission bell housing. Modernly, bell housings are cast as part of the transmission and do not include an inspection pan, however, to effectuate some of the embodiments herein, a portion of the bell housing may need to be removed as in conventional inspection pan systems.

A pressure plate 110 covers a portion of a clutch assembly. A transmission input shaft 112 extends into a pilot bushing 114, and the flywheel 116 is partially shown for reference. The pilot bushing 114 is recessed into the crankshaft flange 115 at the end of the input shaft 112. As can be seen in FIG. 1A, to remove the clutch assembly requires pulling the clutch assembly away from the pilot bushing 114 until the input shaft 112 clears the pilot bushing 114 enough for the pressure plate 110 to be completely removed.

The embodiment shown in FIG. 1B includes a shortened input shaft 120 and a modified pilot bushing 118. In FIG. 1B the pilot bushing 118 is modified to have an edge flush with the flange 117. Moreover, the input shaft 120 may be shorted so it does not extend far into the bushing 118. The depth of the input shaft may be range from ⅜ inch to 1 inch in certain embodiments, and other suitable dimensions as required in other embodiments of the disclosure.

When minimizing the depth that the input shaft engages the pilot bushing 118, it may not be necessary to bevel the front edge of the input shaft to such a degree as conventional input shafts because, with the embodiments shown herein, the input shaft may now be installed separately from the transmission in a much easier fashion, thus providing an additional benefit of a larger total shaft surface area to engage with the inner surface of the pilot bushing 118 despite its shortened length.

Clutch Fork

Conventional clutch forks may be installed having a fixed rivet and clamp, or another type of fastener. In certain embodiments the transmission clutch fork may need to be installed with a removable attachment. Removable fasteners such as screws, nuts and bolts, and the like may be preferable to facilitate removing the clutch fork assembly. In certain embodiments, when the inspection pan makes up the bottom portion of the opening for a clutch fork attached to a bell housing, removal of the inspection pan then creates an opening to remove the clutch fork by dropping it down and out of the way.

Throw Out Bearing

Figure 2:
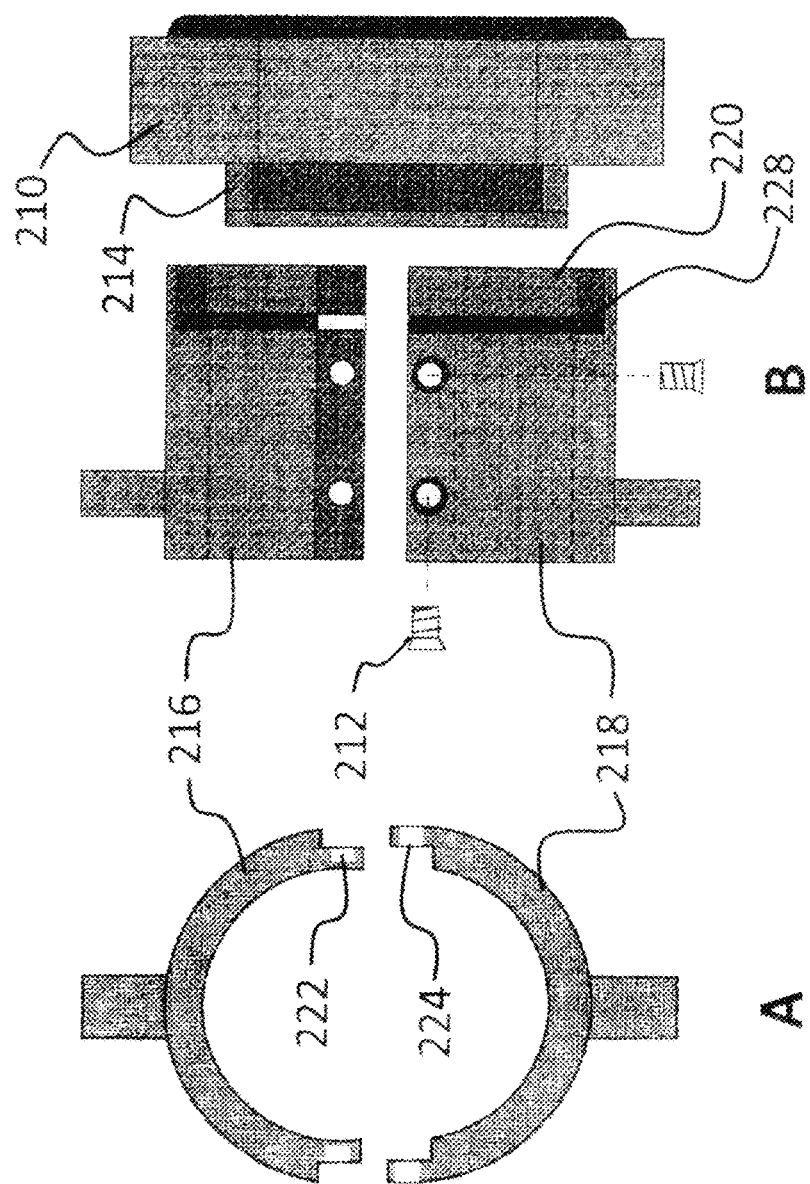
FIG. 2 shows an embodiment of a throw-out bearing according to the current disclosure.

FIG. 2 shows a side and end view of an embodiment of a throw-out bearing according to the current disclosure. Conventionally, a throw-out bearing is a part of an automotive clutch system that temporarily disengages the engine from the manual transmission while shifting. It translates a linear thrust force from the clutch pedal to the spinning clutch plate assembly mounted to the flywheel. A conventional throw-out bearing is often press-fit into a sleeve for holding it in place. In FIG. 2 throw-out bearing 210 includes a tab 214 extending into a removable throw-out bearing sleeve. The throw-out bearing sleeve is split into two parts, an upper throw-out bearing sleeve 216 and a lower throw-out bearing sleeve 218 for positioning around a front transmission cover/input shaft (not shown).

The throw-out bearing sleeves are formed to have a channel (or recessed area) 220 extending into the center portion of the upper 216 and lower 218 sleeve so that when the upper sleeve 216 and lower sleeve 218 mate together they form the channel or recessed area 220. The tab 214, the race 228 and the channel 220 are formed to mate such that the assembled sleeve (the upper and lower portions when joined) couples to the tab 214, and consequently the throw-out bearing 210, when assembled. The tab 214 may include flat surfaces for reducing torsion between the sleeves and the throw-out bearing. Thus the throw-out bearing will not rotate because of tab 214, it will be stable because of channel 220 and will not move forward because of race 228.

The upper sleeve 216 and the lower sleeve 218 may, in one embodiment, be fastened together with a screw 212 by forming a tapped receiver 222 in the upper sleeve 216 and a tapered hole 224 in the lower sleeve 218 as shown. The sleeves may also be fastened using any number of conventional means such as nuts and bolts, or by other suitable fastening devices. In operation, a standard sized hex screw which is clearly accessible may be preferred, however clearances within or in the event of a failure, may necessitate alternative means.

With the splitting and removal of the throw-out bearing sleeve, the redesigned throw-out bearing can be slid back toward the gear box exposing the front transmission cover.

Front Transmission Cover

Figure 3:
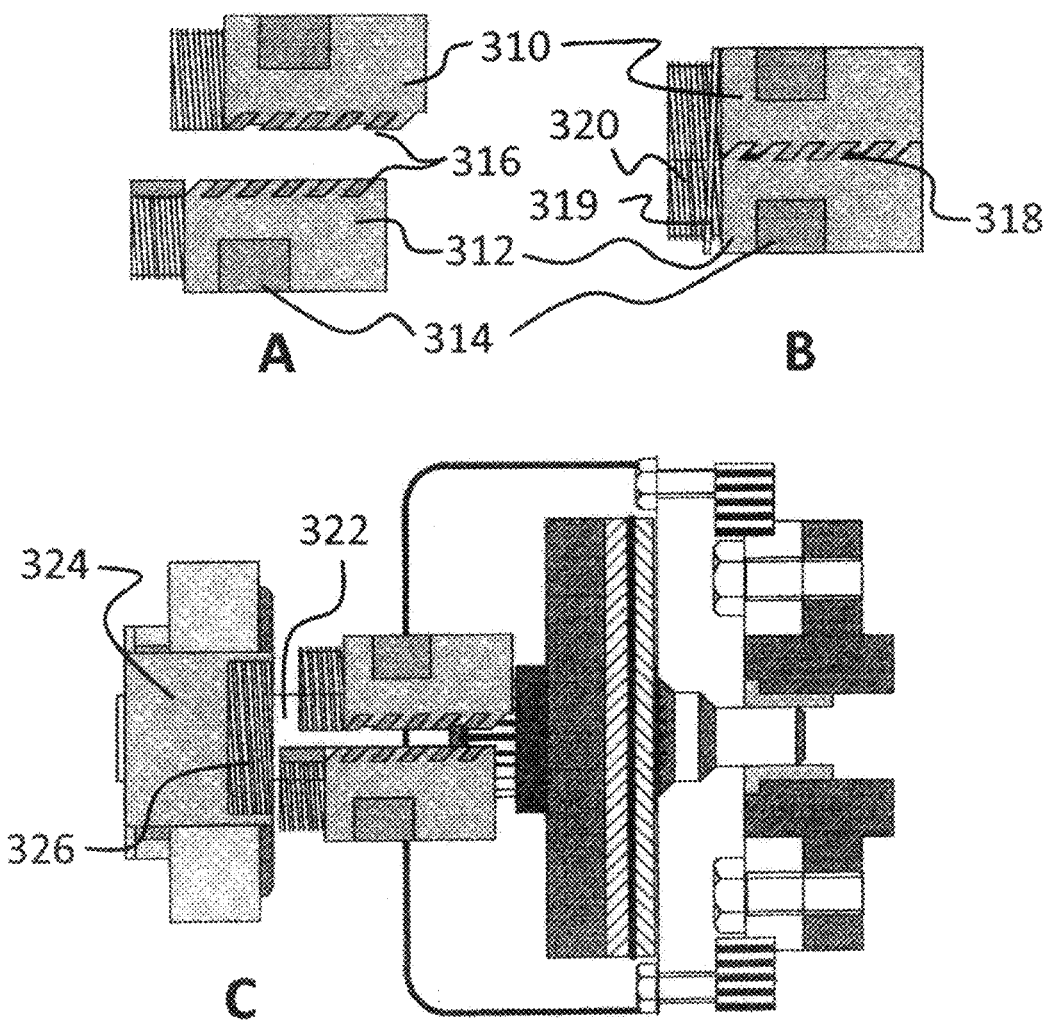
FIG. 3 shows an embodiment of a front transmission cover.

FIG. 3 shows an exploded view of a front transmission cover. The front transmission cover is designed to cover the input shaft at one end of a transmission and allows for the throw-out bearing to slide back and forth during operation. For easy removal of the transmission cover, it may be split into two parts to form a tube, as shown in FIG. 3A. The transmission cover may include a top part 310 and a bottom part 312 which are formed to mate together, as shown in 3B. Mating may be effectuated by having complementary, slanted grooves (or teeth) 316 which mate by pushing at an angle, and allow for the cover to be sealed. With the teeth on one part of the tube angled into the slots on the other half of the tube as shown, the tube cannot be pulled apart once screwed into place. Notches 318 on each side of the front cover may provide a recess to insert a screw driver in order to pry the two halves apart if necessary. When mated, the transmission cover part 310 and bottom part 312 form a threaded end 320.

Slots 314 are cut into the tube in one embodiment to allow for gripping with a wrench. In some embodiments the two parts 310 and 312 may be held together with screws (not shown) or another suitable fastener means. Moreover, the two parts 310 and 312 may snap together and be held by a lock washer 319 disposed over the threaded end 320.

A second, circular cover, or stub 324 also encloses the input shaft 322. The stub 324 has a (female) tapped receiver section 326 for mating to the (male) threaded end 320 of the tube. When installed, the tube's threaded end 320 fits into the receiver section 326. In other embodiments, the male and female tapped and threaded portions may be reversed on the respective receiver section 326 and threaded end 320.

In operation the front transmission cover may be removed by unscrewing it from the stub 324 and prying the top part 310 and the bottom part 312 apart (removing any lock washer if present) thus allowing access to the input shaft 322.

Split Input Shaft

Figure 4:
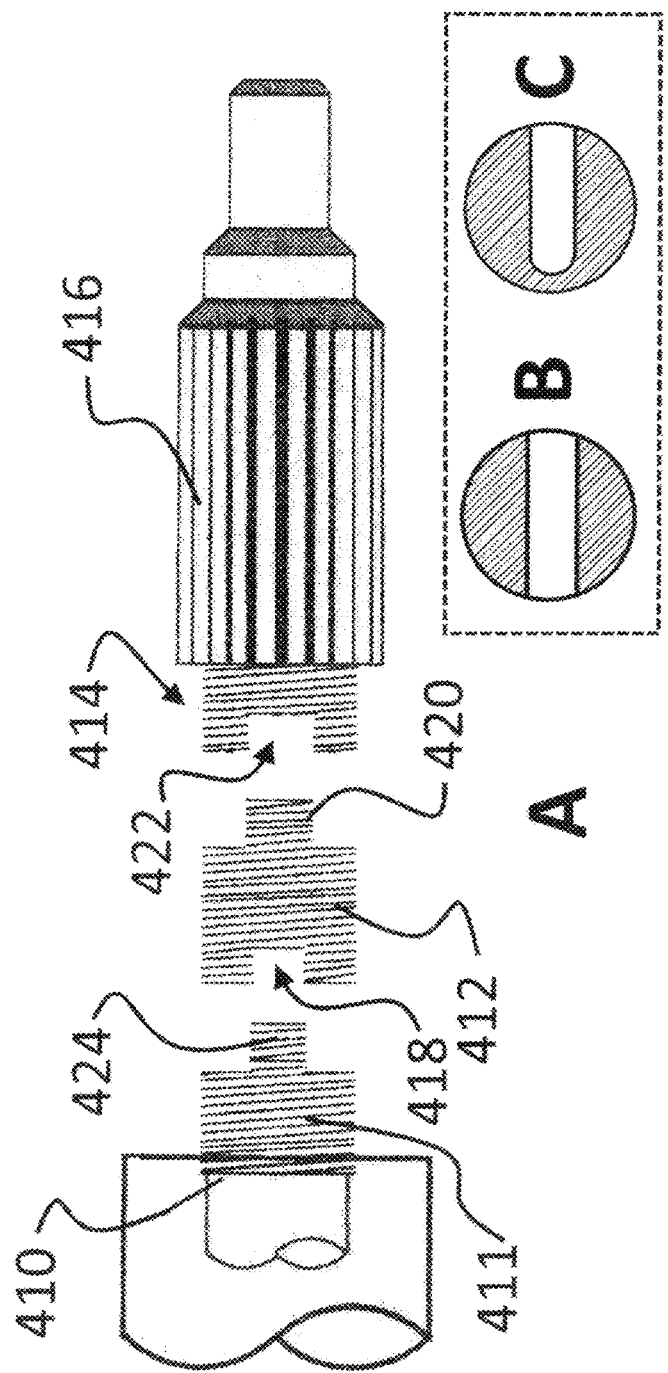
FIG. 4 shows an embodiment of a portion of a split input shaft in a tongue-in-groove configuration.

FIG. 4 shows an embodiment of a portion of a splittable input shaft shown in an exploded configuration. To remove the input shaft from a transmission may require that the input shaft be splittable and that a section of the input shaft be removable. As shown in FIG. 4 the input shaft can be split into three sections, a transmission (or rear) section 410, a coupling (or center) section 412 and a spline gear (or front) section 416 that includes a spline gear on the outer surface of the spline gear section 416.

As shown, the exterior sections of the split input shaft are threaded in a complementary manner to allow them to be joined together with other hardware described herein. The transmission section 410 is attached to a transmission and has a threaded nipple 411. Extending from a threaded nipple 411 is a threaded tab 424. The threaded tab 424 is centered and extends across the face of the nipple 411 as shown in FIG. 4B. The mating surfaces of FIG. 4A are tongue-in-groove surfaces with the tongue and groove centered and extending all the way across the mating surfaces.

The coupling section 412 includes a notch or a groove 418 which extends across the coupling section 412. The notch 418 is designed to provide a snug fit for tab 424 such that the threads on the exterior surface of the nipple 411 and the exterior surface of the coupling section 412 provide a smooth continuous thread. In some embodiments as shown in FIG. 4C, the notch 418 and tab 424 need not extend completely across the center of their respective members. The notch 418 has a predetermined width (such as for example, but not limited to ¼-inch) and a threaded tab 420, which is larger than the notch 418. For example, and without limitation, the tab 420 may be ⅜-inch diameter.

The spline gear section 416 also includes a threaded portion 414 and a notch 422. The notch 422 is sized to receive the threaded tab 420 from the coupling section 412. The tab 420 mates to the notch 422 in a similar fashion as tab 424 mates to notch 418. The notch 422 is shown larger than notch 418 to allow for the spline gear section 416 to slide easily over the tab 424 when the coupling section 412 is removed.

In operation, the coupling section 412 may be removed by sliding the coupling section 412 out from between the tab 424 and out of the notch 422. Since the notches extend completely across the shaft, the coupling section 412 may be removed in one of two different directions, being along the axis of the notch. Once the coupling section 412 is removed, the spline gear section 416 may slide towards the transmission section 410 such that notch 422 slides over the tab 424 and becomes free of the pilot bushing. The distance the spline gear section 416 needs to move will depend on how far into a pilot bushing the spline gear section 416 is inserted.

Input Shaft Strength

Another embodiment of a shaft split is shown in FIG. 4C. FIG. 4C shows a notch or groove of a tongue-in-groove that may be used to couple 424 to 418 and 420 to 422. By not extending the notch all the way across the shaft and creating a cap, there may be increased structural integrity of the input shaft, however, the coupling section 412 may only be removed in a single direction, being along the axis of the notch in the direction that the notch opens.

Figure 5:
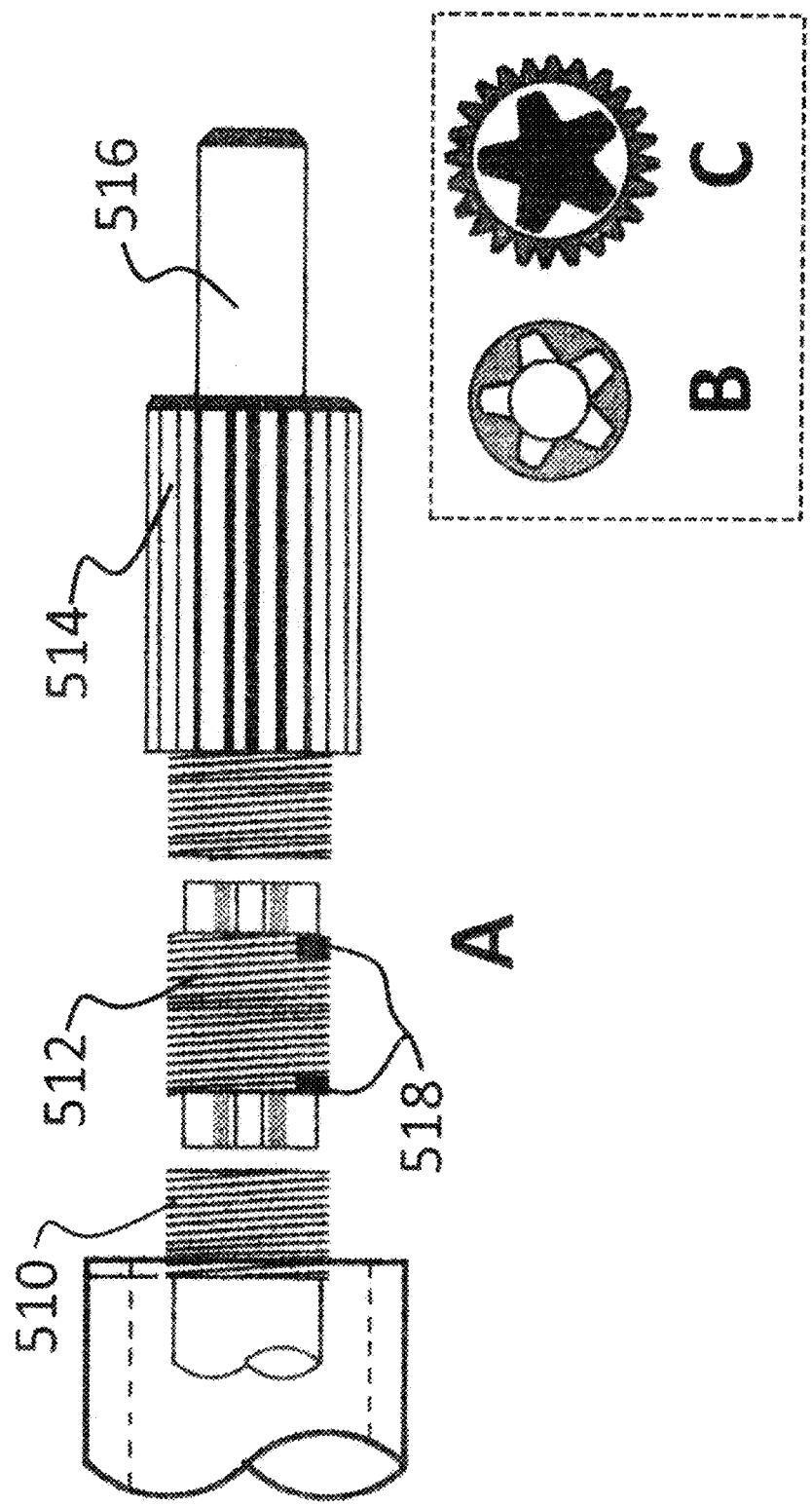
FIG. 5 shows different embodiment of a portion of a split input shaft with a polygonal gear configuration.

FIG. 5 shows various alternative embodiments of different ways to split the input shaft. In FIG. 5, there is a transmission section 510, a coupling section 512 featuring a 5-point gear structure on its end surfaces, and a spline gear section 514. While a 5-point gear structure is shown, this disclosure should not be limited. For example, and without limitation poly-drive, double-hex, spline gear and similar type shapes may also be employed in certain embodiments. The spline gear section 514 has a slightly elongated shaft 516 for insertion into a pilot bushing as described herein. The coupling section 512 may have gears formed on each end, and those gears may mate with complementary female gear receivers on the respective transmission section 510 and spline gear section 514. Representative gear patterns are shown in views 5A and 5B, however, this disclosure should not be read to limit these shapes in any way, as other suitable shapes and complementary voids can be substituted which can provide removable but robust coupling capable of transmitting high torque through the assembled input shaft.

By forming the coupling section 512 to have one aspect of a gear, as an example embodiment, a male pattern can be selected having a matching (complimentary) female gear pattern on the transmission section 510. Similarly, the coupling section 512 could couple to the spline gear section 514. In effect a gear and hub structure is formed. In certain embodiments the coupling section 512 may be symmetrical by having equivalent gears on both ends, but still must be inserted in only one direction for the threading to align. In other embodiments, the gear pattern may be different on each end so that the coupling section 512 only fits in one way. This may be preferable to align the exterior threading. Alternative embodiments may include increasing the diameter of the input shaft, the throw-out bearing and other members to maintain the strength of the input shaft.

In operation, notches 518 may be formed in the coupling section 512 to allow a user to pry apart the coupling section 512 from the spline gear section 514 and the transmission section 510. When prying, the elongated shaft 516 would extend further into the crankshaft thus allowing for room between the center section 512 and the spline gear section 514, so that the coupling section 512 may be removed without displacing either the spline gear section 514 or the transmission section 510.

Threaded Sleeve

Figure 6:
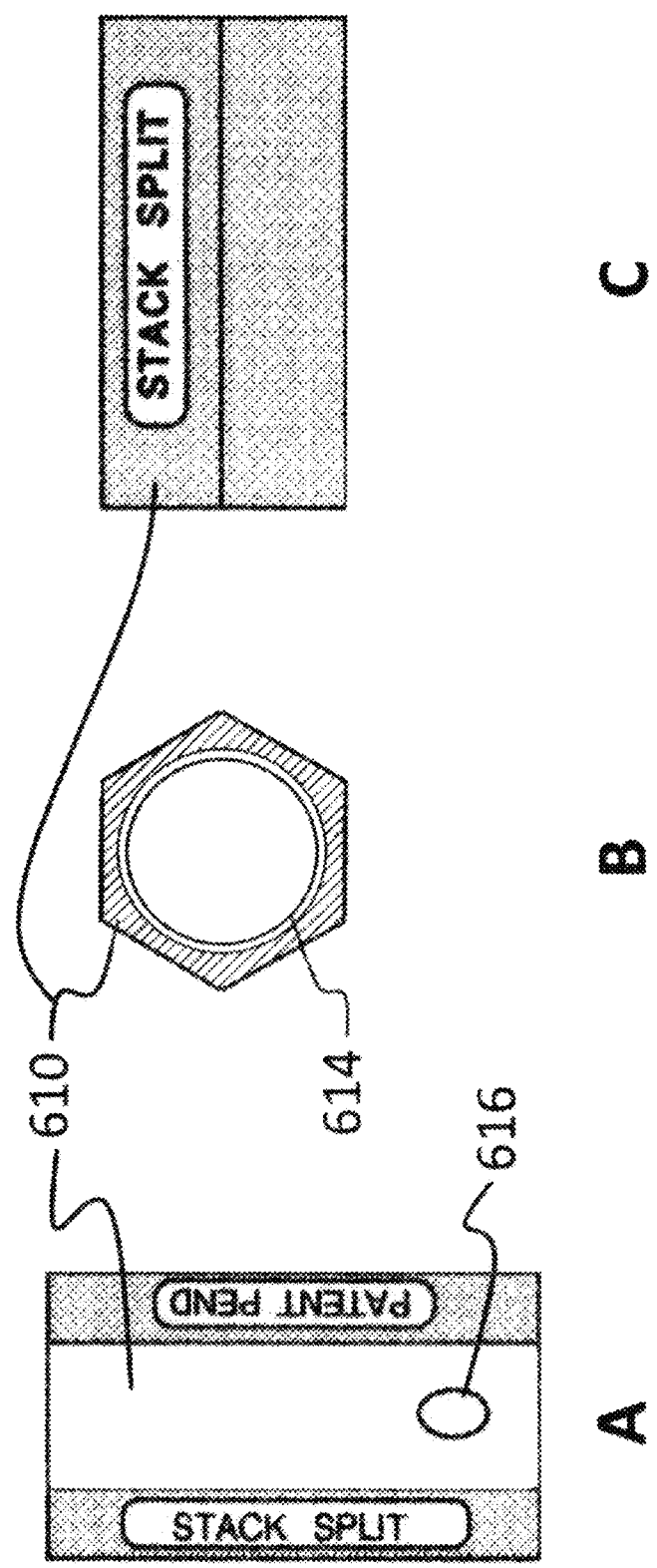
FIG. 6 shows an embodiment of a threaded sleeve.

FIG. 6 shows an embodiment of a threaded sleeve. The threaded sleeve 610 operates to provide alignment for the parts of the split input shaft described herein. The threaded sleeve may provide vertical support as well as keeping the three sections from any lineal or undesired movement or distortion under torque. Interior to the sleeve 610 is internal threading 614, which forms a continuous threaded interior, such that the sleeve 610 may travel back and forth over the split input shaft sections. The three sections of the input shaft should be held firmly, and therefore it might be preferable for the sleeve 610 to use a medium sized internal thread of between 6 to 16 threads per inch (TPI). In various embodiments, threads from small (higher TPI) sizes to large (fewer TPI) may be suitable. The sleeve may include one or more service holes 616 that allows for a user to inspect a section's coupling when the sleeve is disposed over a split input shaft as shown in top view of FIG. 6A.

The threaded sleeve 610, may also be anodized to pacify the surface, or surface treated by conventional means to reduce rust or other friction in order to facilitate its removal. The rear of the spline gear may also need to be machined flat, so the sleeve can tighten against a collar. The exterior shape of the threaded sleeve 610 may vary widely, and is only shown as hexagonal as a representative example embodiment. The hexagonal shape allows for gripping the sleeve 610 with a wrench, however other shapes and tools may be employed to effectuate gripping of the sleeve 610. A hexagon will have a larger diameter than a circular design, but a circular design may require a special wrench, such as a spanner wrench, to work with the sleeve 610.

Figure 7:
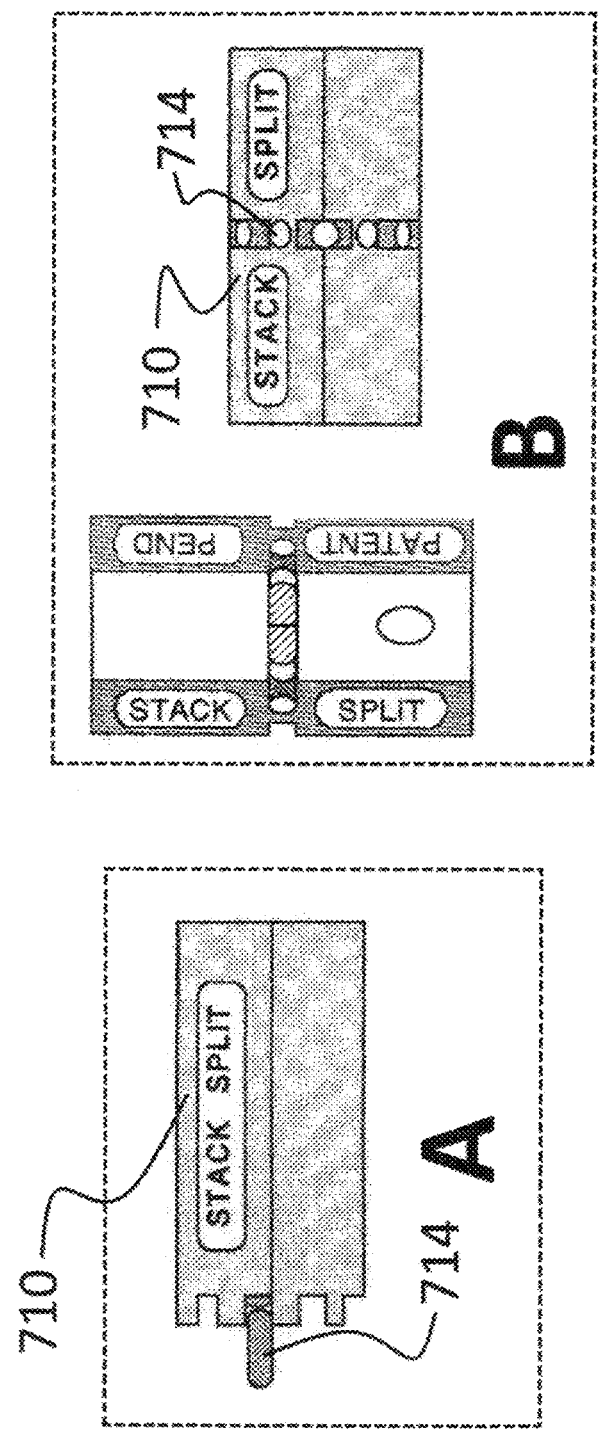
FIG. 7 shows embodiments of multiple ways to secure a threaded sleeve in place.

FIG. 7 shows multiple embodiments of ways to hold a threaded sleeve in place. In operation a threaded sleeve moves along the multiple sections of a split input shaft from the transmission section, over the coupler section, and tightens on the spline gear section because the split input shaft has threading running along a portion of its length. In the embodiment of FIG. 7A the threaded sleeve may be held in place using a cotter pin 714 positioned at an end of the sleeve, away from the spline gear section. In the embodiment of FIG. 7B, cotter pin(s) holes 714 may extend into the sleeve 710, through an input shaft and out of a bottom part of the sleeve 710. Other embodiments may include bending the exposed portion of the cotter pin 714 back along the input shaft to facilitate size or installation constraints. Some embodiments may include the use of a reverse thread to hold the sleeve in place against any rotational force imposed upon it. Depending on the rotation of the input shaft, the threading may be optimized to effect a secure fitting over the input shaft coupling. In alternative embodiments, a lock washer may also be employed to hold the threaded sleeve in place and coupled to the spline gear. In some embodiments the threaded sleeve could be designed similar to a lock nut to prevent unwanted rotation.

Figure 8:
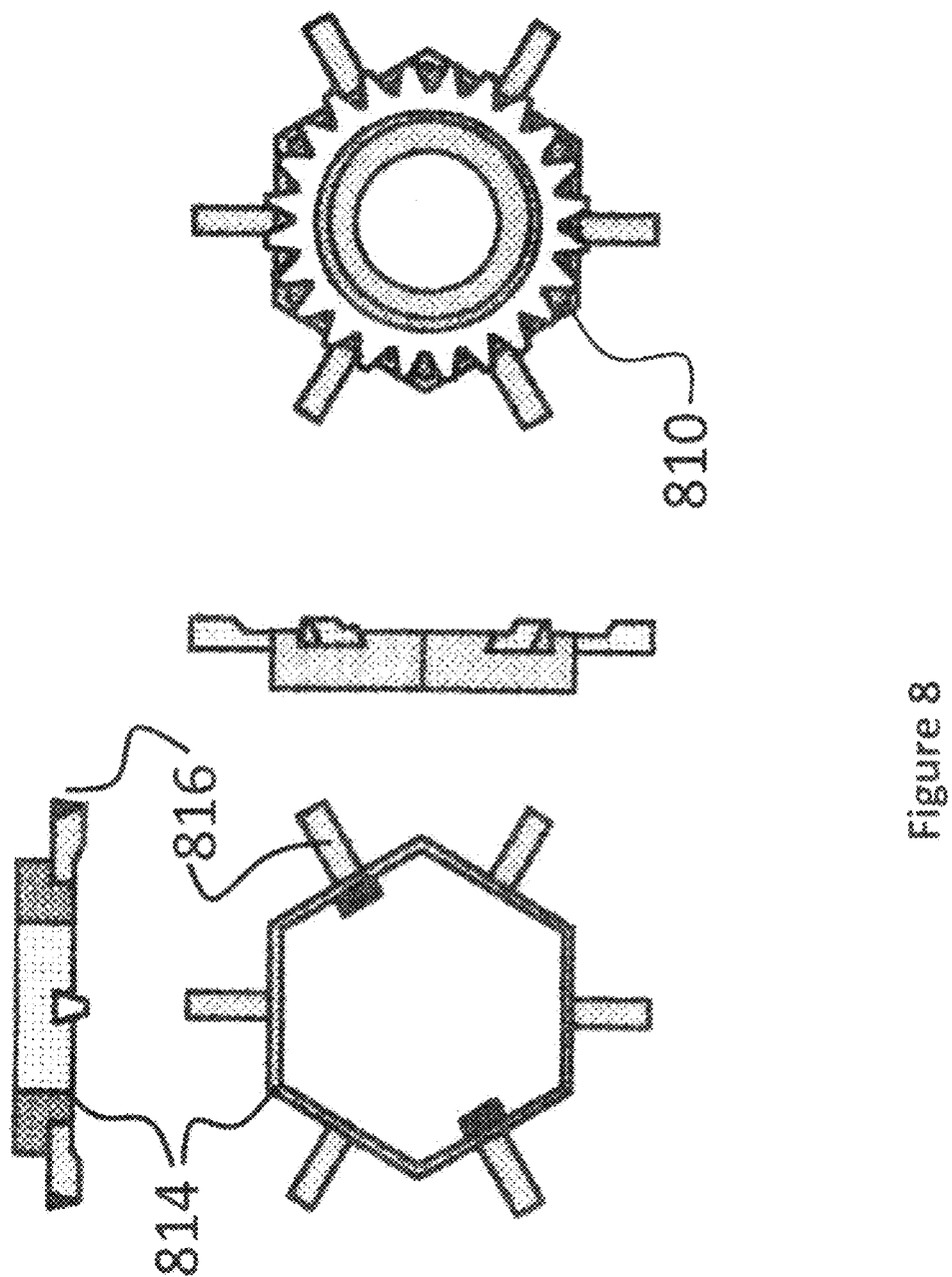
FIG. 8 shows embodiments of a specific design to secure a threaded sleeve in place to a spline gear.

FIG. 8 shows several embodiments of a way to secure the threaded sleeve to a spline gear. In FIG. 8 the threaded sleeve 810 is shown from an end view. In some embodiments a collar 814, shaped to conform to the threaded sleeve, has metal, flexible tabs 816 attached about the periphery. The tabs may be spaced to correspond to grooves on a spline gear and disclosed herein. Placing the collar 814 over the spline gear section of the split input shaft before completely assembling the split input shaft assembly allows for tightening the collar and threaded sleeve to the spline gear. Moreover, since the tabs are spaced in a manner complementing similar spacing as that of the grooves on the spline gear, multiple tabs may be folded over the spline gear for increased stability.

Operation

In operation, a multi-section input shaft with a transmission section coupled to a transmission may have threading about a portion of an exterior surface. Also included is a spline gear section, also with similar threading about a portion of its exterior surface. The spline gear extends into a clutch assembly. Between a transmission section and a spline gear section is a coupling section, which has similar threading about its exterior surface. The coupling section includes a first mating surface attached to a complimentary mating surface on the spline gear section, and a second mating surface attached to a complementary surface on the transmission section. The mating surfaces are designed to let the coupling either slide out of place, or be removed by sliding the spline gear section further into the pilot bushing. The transmission, coupling, and spline gear sections are secured in place with an anodized threaded sleeve which has a threaded interior surface that is able to mate with a correspondingly receptive outer threaded surface of the split input shaft. Together the transmission, coupling, and spline gear sections make up a portion of a vehicle drive train.

Because the coupling section is slidably mounted between the transmission and the spline gear sections, it can be removed when the threaded sleeve is retracted. Once the coupling section is removed, the spline gear section can be slid out of the pilot bushing over a tab or tongue of the transmission section, which, if the spline gear section is appropriately sized, will allow it to drop out of a pilot bushing in the crankshaft. The clutch assembly will then drop out of the drive train without necessitating the displacement of either the engine or the transmission.

System Benefits

Easy replacement of a clutch assembly benefits consumers because of the significant cost reduction for repairing a vehicle with a damaged clutch. A replacement of a clutch assembly may occur several times in the life of the vehicle. Assuming a clutch assembly life of 75,000 miles is average, a passenger vehicle may have a couple of clutch changes in its life. The actual savings is the amount of time required to remove and replace the transmission in a particular vehicle times the hourly rate of the repair shop.

Besides changing a clutch assembly, other repairs may also be facilitated using the methods and devices disclosed herein. For example, replacing leaking seals, a damaged flywheel, or a crankshaft without removing the engine.

The above illustration provides many different embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A clutch assembly comprising:
    a multi-section input shaft disposed within a clutch assembly and front transmission cover coupled between a transmission and an engine of a vehicle, the input shaft comprising:
    a transmission shaft section having an axial end attached to a transmission drive shaft and an opposing axial end comprising a female coupler having a receiver cavity with a polygonal cross-section, a circumferential surface of said transmission shaft section including threading about a portion thereof adjacent the female coupler;
    a spline gear shaft section having an axial end comprising a pilot shaft axially extending therefrom and received within a pilot bushing in a crankshaft attached to the engine and an opposing axial end comprising a female coupler having a receiver cavity with a polygonal cross-section, a circumferential surface of the spline gear shaft section including a clutch spline gear adjacent the pilot shaft and threading about a portion thereof adjacent the female coupler substantially the same size as the threading on the transmission shaft section; and
    a coupling shaft section connected between the spline gear shaft section and the transmission shaft section, said coupling shaft section having opposing axial ends each comprising a male coupler having a polygonal cross-section complimentary to and matingly received within a respective female coupler of the transmission shaft section and the spline gear shaft section, a circumferential surface of the coupling shaft section including threading substantially the same size as the threading on the transmission shaft section and the spline gear shaft section, and including notches to facilitate prying of the coupling shaft section apart from the spline gear shaft section and the transmission shaft section;
    a sleeve comprising a continuous threaded interior surface complimentary to the threading on the transmission shaft section, the spline gear shaft section and the coupling shaft section, a peripheral surface of the sleeve comprising flat sides to facilitate translation of the sleeve along the threading on the input shaft sections; and
    a lock securing the sleeve to the spline gear shaft section;
    wherein when the male couplers of the coupling shaft section are received within the female couplers of the transmission shaft section and the spline gear shaft section, the sleeve is operable to translate along the threading on the input shaft sections from a first position wherein both the male couplers of the coupling shaft section are enveloped by the sleeve and wherein the lock secures the sleeve to the spline gear shaft section, to a second position wherein both the male couplers are not enveloped by the sleeve; and
    wherein when the sleeve is in the second position, the coupling shaft section is removable by prying the spline gear shaft section apart from the coupling shaft section, sliding the pilot shaft of the spline gear shaft section further into the pilot bushing, and allowing the coupling shaft section to be subsequently removed from the transmission shaft section without displacing the transmission shaft section, and subsequently allowing the spline gear shaft section to be removed from the pilot bushing without displacing the engine or the transmission.

2. The clutch assembly of claim 1, wherein the sleeve includes an inspection hole for allowing inspection of the input shaft when disposed therein.

3. The clutch assembly of claim 1, wherein the lock comprises a cotter pin engaging aligned openings in the sleeve and the spline gear shaft section.

4. The clutch assembly of claim 1, wherein the lock comprises a collar connected to the sleeve and having flexible metal tabs spaced about the periphery thereof corresponding to grooves on the clutch spline gear for receiving the metal tabs.

* * * * *